F. P. SCOTT.
Portable Farm-Fences.
No. 154,091. Patented Aug. 11, 1874.
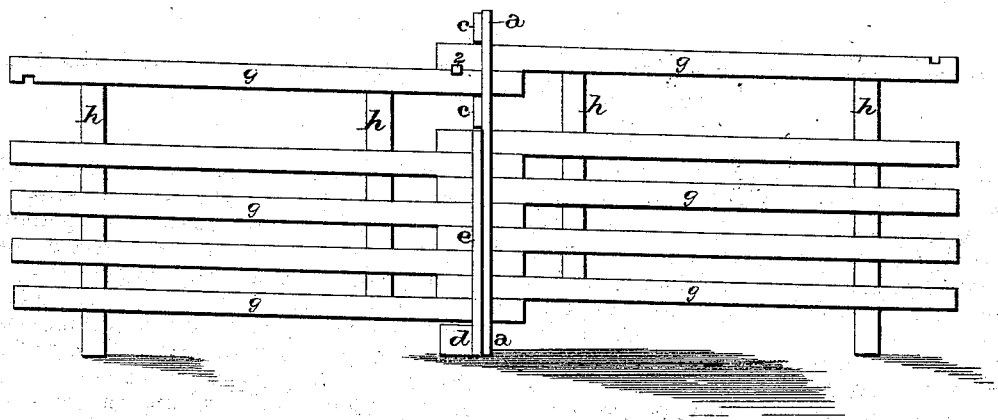
WITNESSES.
F. B. Townsend.
E. T. Kaiser
INVENTOR.
F. P. Scott
per
F. A. Lehmann, Atty

UNITED STATES PATENT OFFICE.

FRANKLIN P. SCOTT, OF CLAYSVILLE, PENNSYLVANIA.

IMPROVEMENT IN PORTABLE FARM-FENCES.

Specification forming part of Letters Patent No. 154,091, dated August 11, 1874; application filed June 16, 1874.

*To all whom it may concern:*

Be it known that I, F. P. SCOTT, of Claysville, in the county of Washington and State of Pennsylvania, have invented certain new and useful Improvements in Fences; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in fences; and it consists in the arrangement and combination of parts, which will be more fully described hereafter, whereby the sections of the fence can be readily taken down or put together, and so that any one section of the fence can be taken out to let wagons and animals pass through, and thus do away entirely with gates and bars.

The accompanying drawings represent my invention.

$a$ represents two vertical posts, having their upper ends connected together by the two cross-bars $c$, and secured by their lower ends to the ground-sill $d$, and which are braced from each side by the props $e$. The sections of the fence consist of any number of boards or rails, $g$, which are bound together by two or more vertical bars, $h$, the end of one of the said bars being made to extend down below the bottom rail or board, so as to rest upon the ground. The ends of each section are passed through between the two vertical posts $a$, and are thus made to overlap each other, the ends of one section resting upon the ends of the other, so that each section forms an inclined plane, and the weight of one section assists to hold another in place. The two vertical posts $a$ prevent any lateral movement of the sections; and in order to prevent them from moving longitudinally a notch is cut in the upper edge of one rail and the lower edge of another in the other section, and then a pin, 2, is driven through, which locks them firmly in position. By drawing out two of these pins any one section in the fence can be taken out, so that teams or animals can pass through, and thus dispense entirely with gates and bars. By thus making the sections removable the fence can be moved from place to place, and taken down and put up at will.

Having thus described my invention, I claim—

The panels $g$ $h$, with their ends overlapping each other within the post $a$ $c$ $d$ $e$, and locked together by means of the removable pins 2 and notches in the rails, substantially as shown and described.

In testimony that I claim the foregoing I have hereunto set my hand this 12th day of June, 1874.

FRANKLIN P. SCOTT.

Witnesses:
S. C. McCRACKEN,
H. MARTIN.